(12) United States Patent
Hashimoto et al.

(10) Patent No.: US 8,282,884 B2
(45) Date of Patent: Oct. 9, 2012

(54) REACTING APPARATUS, METHOD OF ASSEMBLING REACTING APPARATUS AND REACTOR CONTAINING PACKAGE

(75) Inventors: Toshihiro Hashimoto, Kirishima (JP); Ryuuji Mori, Kirishima (JP)

(73) Assignee: Kyocera Corporation, Kyoto (JP)

( * ) Notice: Subject to any disclaimer, the term of this patent is extended or adjusted under 35 U.S.C. 154(b) by 1075 days.

(21) Appl. No.: 12/280,963

(22) PCT Filed: Feb. 27, 2007

(86) PCT No.: PCT/JP2007/053683
§ 371 (c)(1),
(2), (4) Date: Aug. 27, 2008

(87) PCT Pub. No.: WO2007/099972
PCT Pub. Date: Sep. 7, 2007

(65) Prior Publication Data
US 2009/0068070 A1    Mar. 12, 2009

(30) Foreign Application Priority Data

Feb. 27, 2006 (JP) ................................. 2006-050969
Mar. 28, 2006 (JP) ................................. 2006-088033

(51) Int. Cl.
*B01J 10/00* (2006.01)
*A47J 39/00* (2006.01)
(52) U.S. Cl. .................................. 422/129; 220/592.27
(58) Field of Classification Search .................. 422/129; 220/592.27
See application file for complete search history.

(56) References Cited

U.S. PATENT DOCUMENTS

| 5,534,328 A | 7/1996 | Ashmead et al. |
| 5,772,707 A | 6/1998 | Weishu et al. |
| 7,004,198 B1 | 2/2006 | Okandan et al. |

(Continued)

FOREIGN PATENT DOCUMENTS

JP    09-089840    4/1997

(Continued)

OTHER PUBLICATIONS

European search report dated Aug. 30, 2011 for corresponding European application 07715018.3.

(Continued)

*Primary Examiner* — Lore Jarrett
(74) *Attorney, Agent, or Firm* — DLA Piper LLP (US)

(57) ABSTRACT

A reacting apparatus includes a reactor having a supply port and a discharge port, a first member connected to the surface of the reactor having a through hole associated with the supply port, and a second member connected to the surface of the reactor and having a through hole associated with the discharge port, a supply pipe connected to the supply port by way of the through hole of the first member, to supply a fluid before the reaction to the supply port, and a discharge pipe connected to the discharge port by way of the through hole of the second member, to discharge a fluid after the reaction from the discharge port. The supply port and discharge port include a portion covered by a surface of the first member and a portion communicating with the through hole of the first member. The discharge port includes a portion covered by a surface of the second member and a portion communicating with the through hole of the second member. A first opening of the through hole of the first member includes a portion covered by the surface of the reactor and a portion communicating with the supply port. A second opening of the through hole of the second member includes a portion covered by the surface of the reactor and a portion communicating with the discharge port.

12 Claims, 7 Drawing Sheets

U.S. PATENT DOCUMENTS

| | | |
|---|---|---|
| 2002/0043801 A1 | 4/2002 | Ogawa .................... 285/133.11 |
| 2005/0042149 A1 | 2/2005 | Bard |
| 2005/0112036 A1 | 5/2005 | Funazaki et al. |
| 2005/0172554 A1 | 8/2005 | Basho et al. |

FOREIGN PATENT DOCUMENTS

| | | |
|---|---|---|
| JP | 2002-144300 | 5/2002 |
| JP | 2003-002602 | 1/2003 |
| JP | 2004-283749 | 10/2004 |
| JP | 2004-292015 | 10/2004 |
| JP | 2004-296349 | 10/2004 |
| WO | 9612541 A1 | 5/1996 |
| WO | 9934909 A1 | 7/1999 |

OTHER PUBLICATIONS

European office action dated Oct. 10, 2011 for corresponding European application 07715018.3.

(a)

(b)

(c)

(a)

(b)

(c)

REACTING APPARATUS, METHOD OF ASSEMBLING REACTING APPARATUS AND REACTOR CONTAINING PACKAGE

CROSS-REFERENCE TO THE RELATED APPLICATIONS

This application is a national stage of international application No. PCT/JP2007/053683 filed Feb. 27, 2007, which also claims the benefit of priority under 35 USC 119 to Japanese Patent Application No. 2006-050969 filed Feb. 27, 2006 and Japanese Patent Application No. 2006-088033 filed Mar. 28, 2006, the entire contents of all of which are incorporated herein by reference.

TECHNICAL FIELD

The present invention relates to a reacting apparatus for reacting and discharging a fluid supplied from an outside by a predetermined method and a method of assembling the reacting apparatus, as well as a reactor containing package constituting the reacting apparatus.

RELATED ART

In recent years, there is proposed a reacting apparatus containing a reactor made of a ceramic inside a package brought into a vacuum state. This is a small-sized apparatus for reacting and discharging a fluid supplied from an outside by a predetermined method and can also be used in, for example, a portable apparatus or the like. According to the reacting apparatus, the reactor is contained inside the package brought into the vacuum state, and therefore, heat generated in a reaction is reduced from being transferred to an outside of the package and power generation loss can be reduced.
Patent citation 1: Japanese Unexamined Patent Publication JP-A 2003-2602

DISCLOSURE OF INVENTION

Technical Problem

However, the reactor made of the ceramic is provided with a large shrinkage rate in sintering the ceramic, and therefore, when, for example, a plurality of openings are formed on a surface of the reactor, an accuracy of a pitch of the openings becomes low, and there is a possibility that a positional accuracy in attaching a supply pipe to supply the fluid into the reactor and a discharge pipe to discharge the fluid after the reaction from the reactor at the reactor becomes low. As a result, positions of the supply pipe and the discharge pipe provided at the package and the respective openings provided on the surface of the reactor are shifted and there is a case in which it is difficult to bond the supply pipe and the discharge pipe respectively to the corresponding openings in airtight. Thereby, an inside of the package cannot be brought into the vacuum state, and therefore, the heat generated inside the package is escaped to an outside, as a result, it is difficult to achieve a reduction in the power generation loss.

Further, even when the reactor is formed of a material other than ceramic, there is a possibility that the positions of the openings are shifted from predetermined positions by a dispersion in fabrication and the positional accuracy in attaching the supply pipe and the discharge pipe to the reactor becomes low. Further, thereby, it is difficult to respectively bond the supply pipe and the discharge pipe to the corresponding openings in airtight, an inside of the package cannot be brought into the vacuum state, and therefore, the heat generated inside the package is escaped to the outside, as a result, there is a case in which it is difficult to achieve the reduction in the power generation loss.

On the other hand, in a related art, there is adopted a method of mounting a plurality of parts of the supply pipe, the discharge pipe and the like successively individually to the package, according to the method, stresses in individual bonding are accumulated, a warp is liable to be brought about at a vicinity of a boding portion of the package, and when the package is constituted by bonding a plurality of parts of, for example, a base body and a lid, there is a case in which it is difficult to seal the package in airtight. Further, when the warp is brought about as described above, it is difficult to bring the package into the vacuum state, and heat generated in reacting a substance inside the package is transferred to an outside of the package. As a result, it is difficult to achieve the reduction in the power generation loss.

Further, when a chemical reaction inside the reactor is an endothermic reaction, in order to progress the reaction in the reactor, it is necessary to maintain a reaction temperature at a constant temperature by heating the reactor by a heater or the like, a temperature of the reactor is liable to be lowered by conducting heat generated inside the reactor as described above to a reactor container.

However, when a heat generating amount of the heater is increased for maintaining the reaction temperature, an electric capacity used for heating by the heater is increased, as a result, there poses a problem that a power generation lose of a total of a micro reactor system is increased.

The invention has been carried out in order to resolve the problem, and it is an object thereof to provide a reacting apparatus having a small power generation loss and an assembling method thereof, as well as a reactor containing package constituting the reacting apparatus.

Technical Solution

One aspect of a reacting apparatus of the invention includes a reactor having a supply port to which a fluid before a reaction is introduced and a discharge port from which the fluid after the reaction is delivered on a surface thereof; a first connecting member connected to the surface of the reactor and having a through hole associated with the supply port and a second connecting member connected to the surface of the reactor and having a through hole associated with the discharge port; a supply pipe connected to the supply port by way of the through hole of the first connecting member, to supply the fluid before the reaction to the supply port; and a discharge pipe connected to the discharge port by way of the through hole of the second connecting member, to discharge the fluid after the reaction from the discharge port. The supply port comprises a portion covered by a surface of the first connecting member and a portion communicating with the through hole of the first connecting member, or comprises only a portion communicating with the through hole of the first connecting member. The discharge port comprises a portion covered by a surface of the second connecting member and a portion communicating with the through hole of the second connecting member, or comprises only a portion communicating with the through hole of the first connecting member. A first opening of the through hole of the first connecting member comprises a portion covered by the surface of the reactor and a portion communicating with the supply port. A second opening of the through hole of the second connecting member comprises a portion covered by the surface of the reactor and a portion communicating with the discharge port.

One aspect of a method of assembling a reacting apparatus according to the invention is a method of assembling a reacting apparatus by connecting the supply pipe to supply a fluid before a reaction and the discharge pipe to discharge the fluid after the reaction from a discharge port to a supply port to introduce the fluid before the reaction and the discharge port to deliver the fluid after the reaction respectively provided to the reactor, respectively. The supply pipe includes an end portion provided with a first opening associated with the supply port, and the discharge pipe includes an end portion provided with a second opening associated with the discharge port. The assembling method includes an arranging step of respectively arranging a first connecting member having a first through hole associated with the supply port and a second connecting member having a second through hole associated with the discharge port on a surface of the reactor such that the first through hole and the second through hole are apart from each other by a predetermined distance, and a connecting step of simultaneously connecting the first opening and the second opening to the first through hole and the second through hole.

One aspect of a reactor containing package of the invention includes a housing having a hollow portion to contain a reactor and having an opening communicated with the hollow portion on a surface thereof, and a plate-like member to cover the opening and having through holes penetrating a supply pipe and a discharge pipe connected to the reactor.

Further, Another aspect of the reacting apparatus of the invention includes the reactor containing package mentioned above and a reactor connected with the supply pipe and the discharge pipe.

Advantageous Effects

According to one aspect of the reacting apparatus of the invention, even when a pitch accuracy of the supply port and the discharge port formed at the reactor is low, the supply port and the discharge port as well as the supply pipe and the discharge pipe corresponding thereto can be connected in airtight, and heat necessary for a reaction in the reactor can be restrained from escaping to the outside. Therefore, the reacting apparatus having a small power generation loss can be realized.

Further, according to one aspect of the method of assembling a reacting apparatus of the invention, even when a pitch accuracy of the supply port and the discharge port formed at the reactor is low, the supply port and the discharge port as well as the supply pipe and the discharge pipe corresponding thereto can be connected in airtight, and heat necessary for a reaction in the reactor can be restrained from escaping to the outside. Therefore, the reacting apparatus having a small power generation loss can be assembled.

According to the reactor containing package of the invention, a heat amount transferred from the reactor inside thereof to the outside of the package can efficiently be reduced and the power generation loss can be reduced.

Further, according to the reacting apparatus using the reactor containing package, an insulating property at the inside thereof can excellently be maintained, and therefore, the power generation loss can be reduced.

BEST MODE FOR CARRYING OUT THE INVENTION

Figure 1:
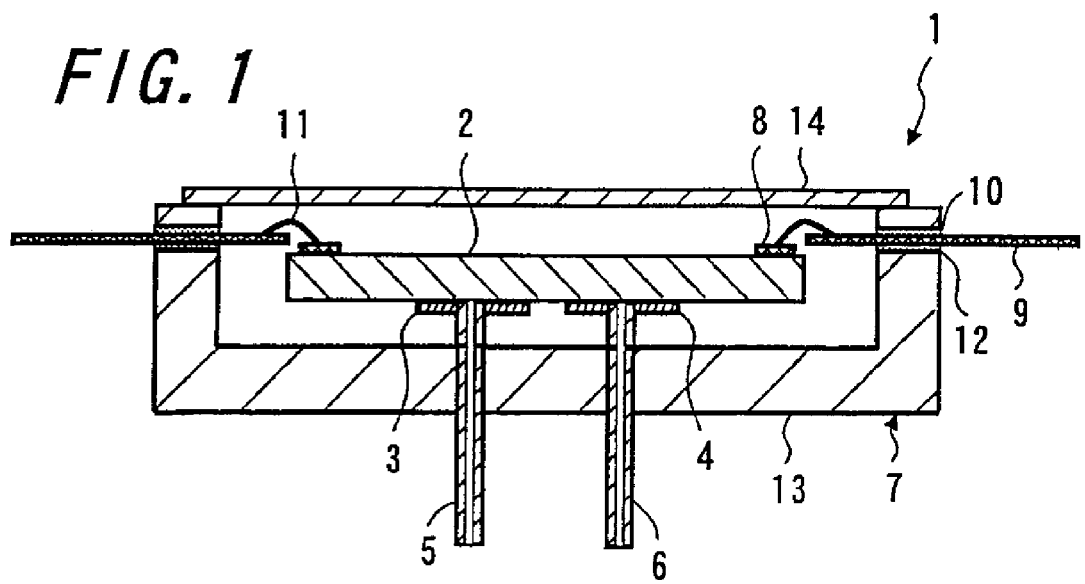
FIG. 1 is a sectional view showing a constitution example of a reacting apparatus according to a first embodiment of the invention.

Now referring to the drawings, embodiments of the invention are described in detail below.

First Embodiment

Figure 2:
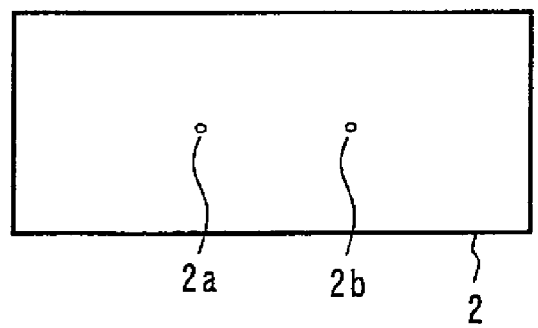
FIG. 2 is a bottom view of a reactor in the reacting apparatus shown in FIG. 1.

FIG. 1 is a sectional view showing a constitution example of a reacting apparatus according to a first embodiment of the invention, and FIG. 2 is a bottom view of a reactor in the reacting apparatus shown in FIG. 1. As shown in FIG. 1 and FIG. 2, a reacting apparatus 1 according to the embodiment includes a reactor 2 having a supply port 2a and a discharge port 2b, a plate 3 having a through hole 3a, a plate 4 having a through hole 4a, a supply pipe 5 inserted to the through hole 3a, a discharge pipe 6 inserted to the through hole 4a, and a package 7 to contain the reactor 2. Further, the reacting apparatus 1 may include an electrode 8 on a surface of the reactor 2 and include an insertion hole 10 to insert a lead terminal 9 to the package 7. At this occasion, the electrode 8 provided on the surface of the reactor 2 is electrically connected to the lead terminal 9 by way of a bonding wire 11. Further, the insertion hole 10 is arranged with a seal member 12 to seal and fix the lead terminal 9 while insulating the lead terminal 9. Further, although in FIG. 1, the package 7 is constituted by a base body 13 having a cavity and a lid 14 to cover the cavity, a number and shapes of members constituting the package 7 are arbitrary.

The reactor 2 is made of, for example, a ceramics. As shown in FIG. 2, the reactor 2 includes the supply port 2a to which a fluid before a reaction is introduced and the discharge port 2b from which the fluid after the reaction is delivered. The reactor 2 generates a hydrogen gas (the fluid after the reaction) by introducing a mixture gas of an alcoholic gas fuel and oxygen (fluid before the reaction) to the supply port 2a. A fluid after the reaction (hydrogen gas) is delivered from the discharge port 2b of the reactor 2.

When the reactor 2 is formed by an aluminum oxide sintered body of a dense quality having, for example, a relative density equal to or larger than 95%, for example, first, a raw material powder of the aluminum oxide sintered body is prepared by adding and mixing a sinter promoter of a rare earth oxide powder, an aluminum oxide powder or the like to an aluminum oxide powder. Successively, a green sheet of a predetermined thickness is fabricated by preparing a paste by adding and mixing an organic binder and a dispersion medium to the raw material powder, and subjecting the paste to a doctor blade method, or by preparing a product by adding the organic binder to the raw material powder, and subjecting the product to pressing molding or rolling molding. Thereafter, after positioning and laminating and press-contacting a predetermined number of sheets of sheet-like compacts, the laminate is fired at a temperature of a sinter maximum temperature of 1200 through 1500° C. in, for example, a nonoxidizing atmosphere to thereby provide the aimed reactor 2 made of the ceramics. Further, a molding may be carried out by a powder molding press method.

Further, a groove portion to make a reacting substance flow through can be formed inside the ceramic reactor in fabricating the green sheet by providing a penetrated portion of a predetermined shape and successively laminating and pressure-contacting another green sheet. A catalyst to react a substance may be borne on a portion constituting a side surface of the groove portion.

When a reaction of a substance introduced into the reactor 2 is an endothermic reaction, an inside of the reactor 2 is formed with a temperature adjusting mechanism, for example, a thin film heater (not illustrated) or a thick film heater (not illustrated) comprising a resistance layer or the like, and the surface is formed with the electrode 8 as a terminal to supply power to the heater. A reaction of a substance can excellently be promoted by adjusting the inside of the reactor 2 by a temperature condition of, for example, about 200 to 800° C. corresponding to a condition of reacting the substance by the temperature adjusting mechanism.

The heater is arranged inside a groove portion or inside an air gap at which a reaction is carried out in the reactor 2, or in a vicinity thereof. By such a constitution, heat generated from the heater can efficiently be used for reacting a substance.

Figure 3:
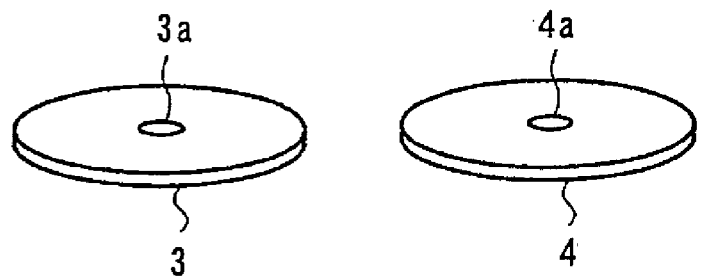
FIG. 3 is a view showing a constitution example of a plate in the reacting apparatus shown in FIG. 1.

FIG. 3 shows an example of the plates 3 and 4 bonded to the surface of the reactor 2. The plate 3 includes the through hole 3a associated with the supply port 2a of the reactor 2 and the plate 4 includes the through hole 4a associated with the discharge port 2b of the reactor 2. The plate 3 is used to connect the supply port 2a of the reactor 2 and the supply pipe 5, and the plate 4 is used to connect the discharge port 2b of the reactor 2 and the discharge pipe 6. Specifically, the supply port 2a and the supply pipe 5 and the discharge port 2b and the discharge pipe 6 are respectively connected by inserting an end portion of the supply pipe 5 to the through hole 3a of the plate 3 and inserting an end portion of the discharge pipe 6 to the through hole 4a of the plate 4. Further, a method of connecting the supply pipe 5 to the supply port 2a by way of the through hole 3a and a method of connecting the discharge pipe 6 to the discharge port 2b by way of the through hole 4a are not limited to insertion but, for example, the supply pipe 5 may be connected to a surrounding of an opening of the through hole 3a of the plate 3 and the discharge pipe 6 may be connected to a surrounding of an opening of the through hole 4a of the plate 4. Further, in the specification, there is a case in which "bonding" is referred to as "connecting".

Further, the plates 3 and 4 are made of a metal material such as an Fe-based alloy such as SUS, Fe—Ni—Co alloy, or Fe—Ni alloy, or oxygen free copper, and are formed into predetermined shapes by a machining method, a pressing method, MIM (Metal Injection Mold) method or an etching method or the like.

Further, the supply pipe 5 and the discharge pipe 6 are respectively a supply path and a discharge path of a raw material or various fluids of a gas fluid or the like. These are formed by, for example, a ceramic material such as $Al_2O_3$ sintered body, $3Al_2O_3.2SiO_2$ sintered body, SiC sintered body, $Al_2O_3$ sintered body, $Si_3N_4$ sintered body, or a glass ceramic sintered body, SUS-based metal material, Fe—Ni alloy, Fe—Ni—Co alloy, a highly heat resistant resin material such as polyimide, or glass. The supply pipe 5 and the discharge pipe 6 may preferably be difficult to be embrittled by a substance included in a reacting gas. Examples of such a material include Fe alloy, ceramics and glass.

In the reacting apparatus 1 shown in FIG. 1, the supply pipe 5 and the discharge pipe 6 are respectively connected to be fixed to the package 7, in this case, the base body 13. A distance between the through holes 3a and 4a are set to be equal to a distance between the supply pipe 5 and the discharge pipe 6 such that the supply pipe 5 and the discharge pipe 6 are inserted. Therefore, when the through hole 3a and the supply port 2a as well as the through hole 4a and the discharge port 2b are respectively communicated with each other, by respectively connecting the supply pipe 5 and the discharge pipe 6 associated with the through holes 3a and 4a, the supply pipe 5 and the discharge pipe 6 can respectively be connected in association with the supply port 2a and the discharge port 2b.

Here, only a portion of the supply port 2a may be communicated with the through hole 3a. That is, a portion of the supply port 2a may be covered by the plate 3 and another portion thereof may be communicated with the through hole 3a. By closing the portion which is not communicated with the through hole 2a by the plate 3, a fluid can be prevented from leaking from the supply port 2a. Similarly, a portion of the discharge port 2b may be covered by the plate 4 and other portion may be communicated with the through hole 4a.

Figure 4:
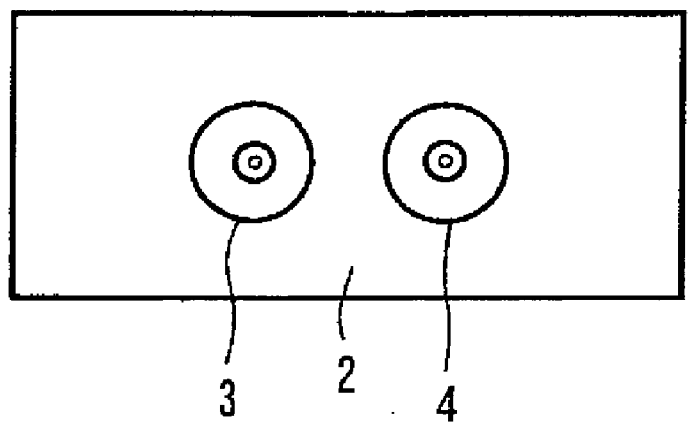
FIG. 4 is views showing positional relationships of a supply port and a discharge port, and through holes of the plate.
Figure 4:
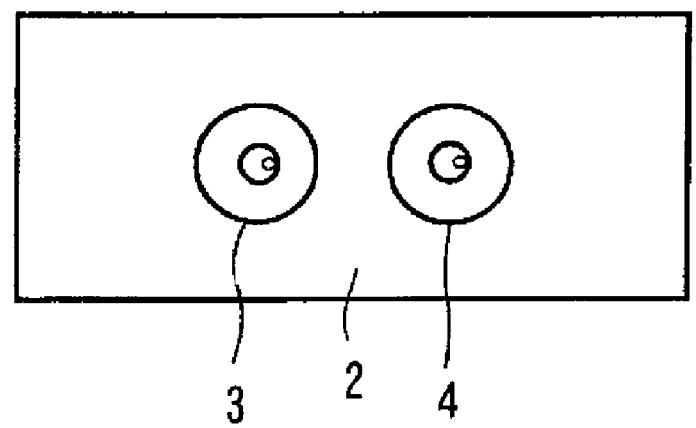
Figure 4:
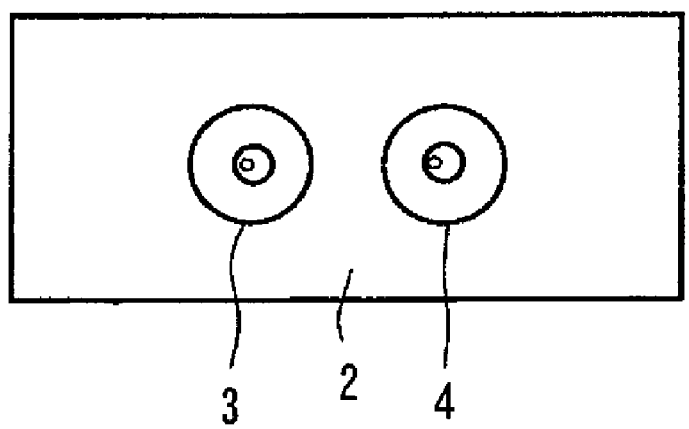

That is, in the reacting apparatus 1 shown in FIG. 1, even when a position of a center of the supply port 2a and a position of a center of the discharge port 2b are more or less shifted from positions of centers of openings of the corresponding through holes 3a and 3b, the supply port 2a and the supply pipe 5 as well as the supply port 2a and the discharge pipe 6 can respectively be connected. FIG. 4 illustrates views respectively showing positional relationships of the supply port 2a and the through hole 3a, and the discharge port 2a and the through hole 3b, respectively. FIG. 4 (a) shows a case in which the position of the center of the supply port 2a and the position of the center of the discharge port 2b coincide with the positions of the centers of the openings of the corresponding through hole 3a and 3b, and FIG. 4 (b) and FIG. 4(c) show cases in which the position of the center of the supply port 2a and the position of the center of the discharge port 2b are shifted from the positions of the centers of the openings of the corresponding through holes 3a and 3b.

According to the reacting apparatus 1 according to the embodiment, even when the positions of the supply port 2a provided on the surface of the reactor 2 and the position of the opening of the supply pipe 5 attached to the package 7 are shifted, by respectively communicating the through hole 3a and the supply pipe 3 as well as the through hole 3a and the supply port 2a, the supply pipe 5 and the supply port 2a can be connected. That is, the shift of the position of the supply port 2a and the position of the opening of the supply pipe 5 can be adjusted by the through hole 3a of the plate 3. Similarly, even when the position of the discharge port 2b provided on the surface of the reactor 2 and the position of the opening of the discharge pipe 6 attached to the package 7 are shifted, by respectively communicating the through hole 4a and the discharge pipe 4 as well as the through hole 4a and the discharge port 2b, the discharge pipe 6 and the discharge port 2b can be connected. That is, the shift of the position of the discharge port 2b and the position of the opening of the discharge pipe 6 can be adjusted by the through hole 4a of the plate 4.

Figure 5:
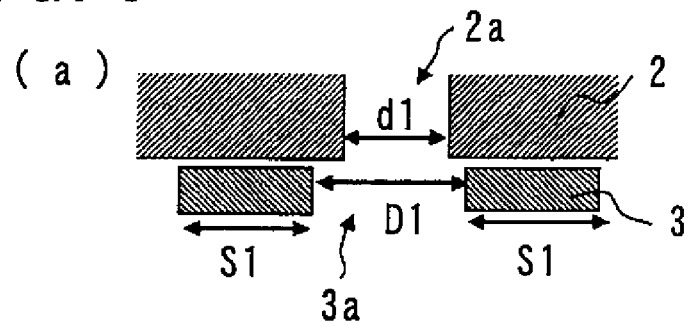
FIG. 5 is sectional views showing a positional relationship between the supply port of the reactor and the through hole of the plate.
Figure 5:
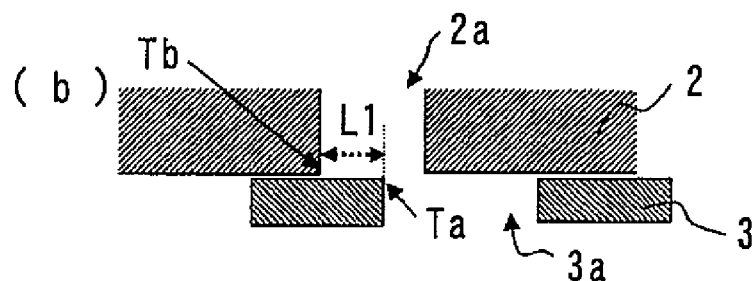
Figure 5:
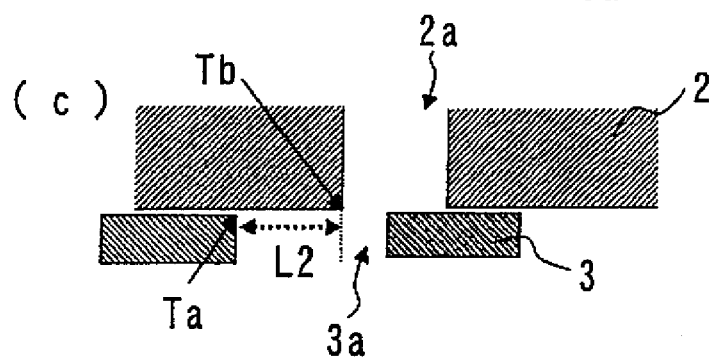
Figure 5:
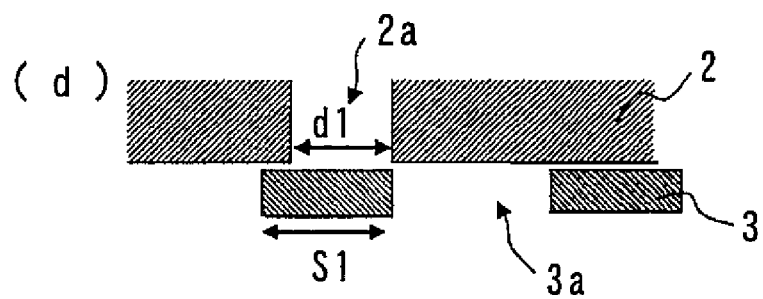
Figure 5:
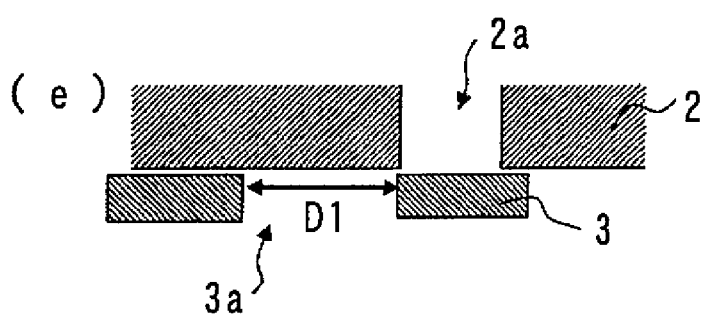

FIG. 5 is sectional views showing a positional relationship between the supply port 2a of the reactor 2 and the through hole 3a of the plate 3. FIG. 5(a) shows a case in which the supply port 2a is communicated with the through hole 3a, FIG. 5 (b) and FIG. 5(c) show a case in which a portion of the supply port 2a is covered by the plate 3 and the other portion thereof is communicated with the through hole 3a, and FIG. 5(d) and FIG. 5(f) show a case in which all of the supply port 2a is covered by the plate 3. In the case in which the supply port 2a and the through hole 3a are communicated with each other, when one edge Ta of the opening of the through hole 3a is shifted from one edge Tb of the supply port 2a associated with the one edge Ta to a side of the supply port 2a by a distance L1, $0 \leq L1 < d1$ and $0 \leq L1 \leq S1$ are established, and when shifted to a side opposed to the supply port 2a by a distance L2, $0 \leq L2 < D1$ is established, wherein d1 denotes an opening diameter of the supply port 2a, D1 denotes an opening diameter of the through hole 3a, and S1 denotes a distance between one edge of the opening of the through hole 3a and an outer peripheral edge of the plate 3. Further, the same goes with a case in which the supply port 2a and the through hole 3a of the plate 3 are respectively regarded as the discharge port 2b and the through hole 4a of the plate 4. That is, in a case in which the discharge port 2b and the through hole 4b are communicated with each other, when one edge Tc of the opening of the through hole 4a is shifted from one edge Td of the discharge port 2b associated with the one edge Tc to a side of the discharge port 2b by a distance L3, $0 \leq L3 < d1$, $0 \leq L3 < S2$ are established, and when shifted to a aide opposed to the discharge port 2b by a distance L4, $0 \leq L4 < D2$ is established, wherein d2 denotes an opening diameter of the discharge port 2b, D2 denotes an opening diameter of the through hole 4a, and S2 denotes a distance between one edge of the opening of the through hole 4a and an outer peripheral edge of the plate 4.

It is preferable that a difference in dimension between the opening diameter of the through hole 3a and the opening diameter of the supply pipe 5 inserted to the through hole 3a, and a difference in dimension between the opening diameter of the through hole 4a and the opening diameter of the discharge pipe 6 inserted to the through hole 4a are equal to or larger than 0.01 mm and equal to or smaller than 0.20 mm, respectively. When equal to or larger than 0.01 mm, in a case in which the supply pipe 5 and the discharge pipe 6 are inserted to the through holes 3a and 4a and bonded by various brazing materials such as Au—Sn alloy, Au—Si alloy, Au—Ge alloy, or Ag—Cu alloy after having been subjected to Ni plating or Au plating treatment necessary for the supply pipe 5, the discharge pipe 6 and the plates 3, 4, insertion to the through holes 3a, 4a is further facilitated. Further, when equal to or smaller than 0.20 mm, after inserting the supply pipe 5, the discharge pipe 6 to the through holes 3a, 4a, when bonded by various brazing materials such as Au—Sn alloy, Au—Si alloy, Au—Ge alloy, or Ag—Cu alloy, the brazing materials can sufficiently fill gaps between the through holes 3a and 4a and the supply pipe 5 and the discharge pipe 6 associated therewith, and airtight sealing can further firmly be carried out. That is, when the difference in dimension between the opening diameter of the through hole 3a and the opening diameter of the supply pipe 5 inserted to the through hole 3a and the difference in dimension between the opening diameter of the through hole 4a and the opening diameter of the discharge pipe 6 inserted to the through hole 4a are equal to or larger than 0.01 mm and equal to or smaller than 0.20 mm, respectively, insertion of the supply pipe 5 and the discharge pipe 6 to the through holes 3a and 4a can smoothly be carried out, further, the gaps between the through holes 3a and 4a and the supply pipe 5 and the discharge pipe 6 associated therewith can sufficiently be filled, and excellent meniscuses of the bonding material such as the brazing material can be formed between the supply pipe 5 and the discharge pipe 6 and the plates 3 and 4 associated therewith and a bonding strength can be increased.

Further, it is preferable that thicknesses of the plates 3, 4 are respectively equal to or larger than 0.10 mm. When equal to or larger than 0.10 mm, the thickness of the plates 3, 4 are sufficiently thick and therefore, positioning of the supply pipe 5 and the discharge pipe 6 to the through holes 3a and 4a is facilitated, and the plates 3 and 4 can sufficiently achieve a function of positioning. An upper limit thickness of the plates 3 and 4 is varied depending on a thickness and a structure of the reactor 2 used and need to be determined in consideration of a stress when brazed to the reactor 2. However, when the plates 3 and 4 are provided with a thickness of about 0.30 mm, a sufficient positioning function is provided when the supply pipe 5 and the discharge pipe 6 are inserted to the through holes 3a and 4a.

In connecting the through hole 3a of the plate 3 and the supply pipe 5, and the through hole 4a of the plate 4 and the discharge pipe 6, bonding members such as various brazing members such as Au—Sn alloy, Au—Si alloy, Au—Ge alloy, or Ag—Cu alloy, glass such as quarts glass or borosilicate glass, various ceramics, an inorganic adhesive including an inorganic polymer, an adhesive including a highly heat-resistant organic material such as polyimideamide, or an adhesive comprising an organic silicon compound such as silicone rubber or silicon resin can be applied, thereby, airtightness of the inside of the reacting apparatus 2 can excellently be maintained over a long period of time by effectively preventing leakage of a fuel gas or an exhaust gas. Further, the same goes with connection of the package 7 and the input pipe 5, and the package 7 and the output pipe 6.

In order to assemble the reacting apparatus 1 shown in FIG. 1, first, the reactor 2 having the supply port 2a and the discharge port 2b on the surface is prepared, thereafter, the plates 3, 4 are bonded to the surface of the reactor 2 provided with the supply port 2a and the discharge port 2b in association with the supply port 2a and the discharge port 2b, respectively. Further, the reactor 2 bonded with the plates 3 and 4 is contained inside the package 7, and the input pipe 5 and the output pipe 6 connected to the package 7 are simultaneously connected to the through holes 3a and 4a of the corresponding plates 3 and 4, respectively. Here, when the plates 3 and 4 are made of a metal, the plates 3 and 4 are bonded to the reactor 2 by, for example, Ag—Cu brazing material. Further, the plates 3 and 4 are arranged such that an interval of the through holes 3a and 4a is equal to an interval of the input pipe 5 and the output pipe 6 connected to the package 7.

Figure 6:
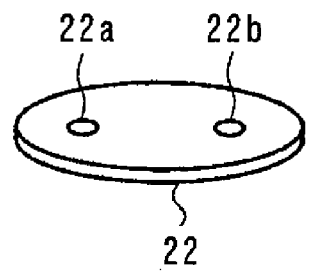
FIG. 6 is a view showing an example of change of shape of the plate in the reacting apparatus.
Figure 7:
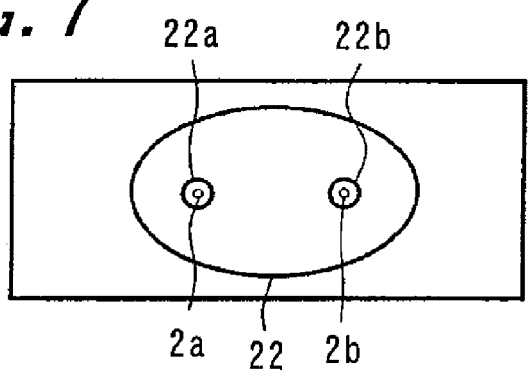
FIG. 7 is a bottom view of the reactor that the plate in FIG. 6 is bonded to a surface thereof.

Further, the plates 3 and 4 may not separately bonded to the surface of the reactor 2 but one plate integrated therewith may be bonded thereto. FIG. 6 shows an example of the plate and FIG. 7 shows a bottom view of the reactor 2 when one plate is bonded to a lower surface of the reactor 2. As shown in FIG.

6 and FIG. 7, the plate 22 is provided with a plurality of through holes 22a and 22b to which the supply pipe 5 and the discharge pipe 6 can be inserted. Here, an interval of the through holes 22a and 22b of the plate 22 is arranged to be equal to an interval of the input pipe 5 and the output pipe 6 connected to the package 7. When the plate shown in FIG. 6 is used, it is not necessary to adjust the interval of the through holes as in a case of using separate plates to bond and bonding of the plate to the reactor 2 is facilitated.

Figure 8:
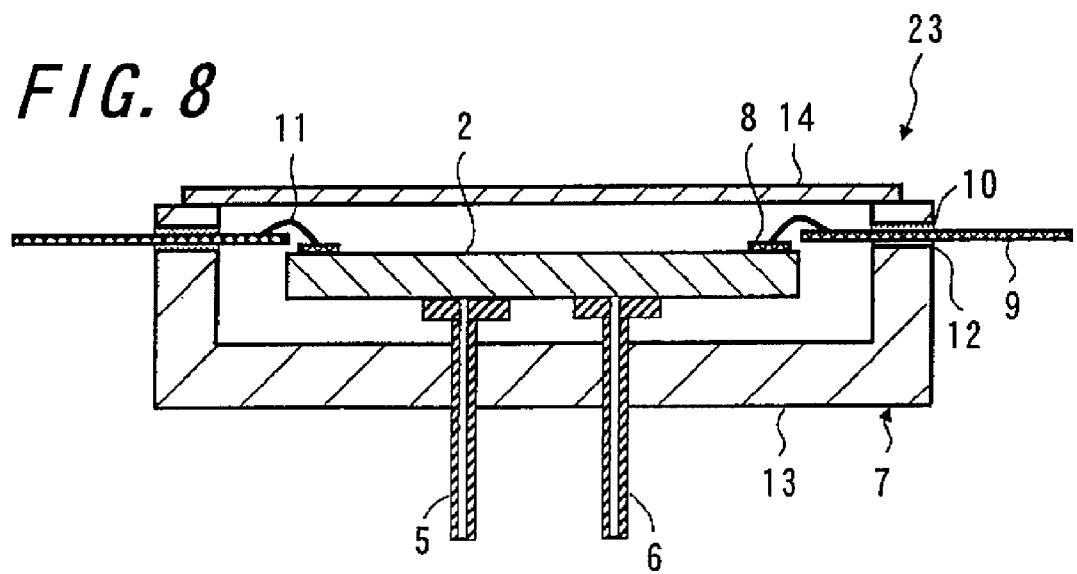
FIG. 8 is a sectional view showing an example of change of shape of a reacting apparatus according to the first embodiment of the invention.

Further, the plates 3 and 4 may not be bonded to the surface of the reactor 2 but the plates 3 and 4 may be bonded thereto in association with the supply pipe 5 and the discharge pipe 6, respectively, and the plates 3 and 4 and the supply pipe 5 and the discharge pipe 6 associated therewith may be integrated, respectively. FIG. 8 is a sectional view showing a constitution example of a reacting apparatus in such a case.

Figure 9:
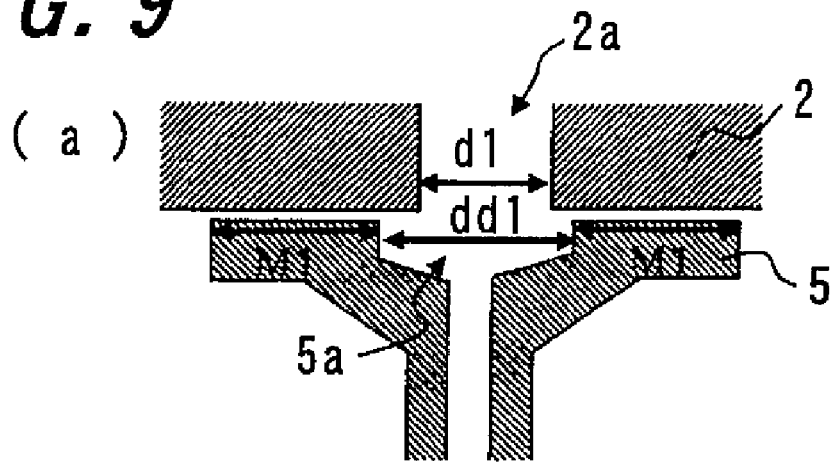
FIG. 9 is sectional views showing positional relationships between the supply port of the reactor and the through hole of the supply pipe in the reacting apparatus shown in FIG. 8.
Figure 9:
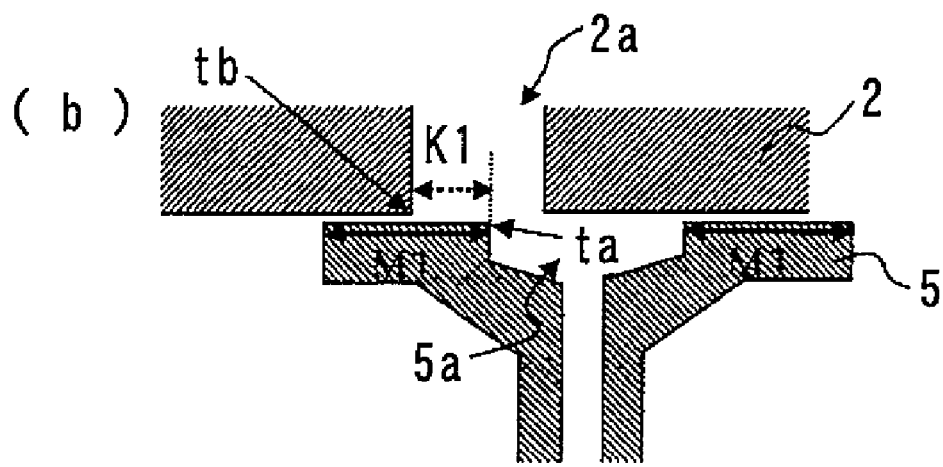
Figure 9:
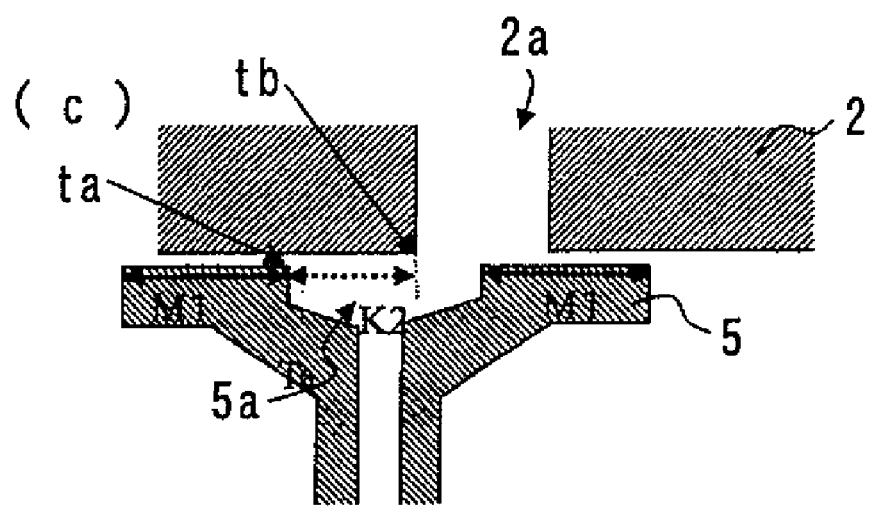

Further, FIG. 9 is sectional views showing positional relationships between the supply port 2a of the reactor 2 and the through hole 5a of the supply pipe 5. FIG. 9(a) shows a case in which the supply port 2a is communicated with the through hole 5a, FIG. 9(b) and FIG. 9(c) show cases in which a portion of the supply port 2a is covered by the plate 3, and the other portion thereof is communicated with the through hole 5a. In a case in which the supply port 2a and the through hole 5a are communicated with each other, when one edge ta of the opening of the through hole 5a is shifted from one edge tb of the supply port 2a associated with the one edge ta to a side of the supply port 2a by a distance K1, $0 \leq K1 < d1$ and $0 \leq K1 < M1$ are established, when shifted to a side opposed to the supply port 2a by a distance K2, $0 \leq K2 < dd1$ is established, wherein d1 denotes the opening diameter of the supply port 2a, dd1 denotes an opening diameter of the through hole 5a, and M1 denotes a distance between one edge of the opening of the through hole 5a and an outer peripheral edge of an end portion of the supply pipe 5. Further, the same goes with a case in which the supply port 2a and the through hole 5a of the supply pipe 5 are respectively regarded as the discharge port 2b and the through hole 6a of the discharge pipe 6. That is, in a case in which the discharge port 2b and the through hole 6b are communicated, when one edge tc of an opening of the through hole 6a is shifted from one edge td of the discharge port 2b associated with the one edge tc to a side of the discharge port 2b by a distance K3, $0 \leq K3 < d2$ and $0 \leq K3 < M2$ are established, and when shifted to a side opposed to the discharge port 2b by a distance K4, $0 \leq K4 < dd2$ is established, wherein d2 denotes the opening diameter of the discharge port 2b, dd2 denotes a diameter of the through hole 6a, and M2 denotes a distance between one edge of the opening of the through hole 6a and an outer peripheral edge of an end portion of the discharge pipe 6.

In the reacting apparatus 1 shown in FIG. 1, the package 7 is constituted by the base body 13 and the lid 14. Both of the base body 13 and the lid 14 serve as a container to contain the reactor 2. The base body 13 and the lid 14 are formed of, for example, a metal material such as Fe-based alloy such as SUS, Fe—Ni—Co alloy or Fe—Ni alloy, or oxygen free copper, a ceramic material such as aluminum oxide ($Al_2O_3$) sintered body, mullite ($3Al_2O_3 \cdot 2SiO_2$) sintered body, silicon carbide (SiC) sintered body, aluminum nitride (AlN) sintered body, silicon nitride ($Si_3N_4$) sintered body, or glass ceramics, or a highly heat-resistant resin material such as polyimide.

Further, glass ceramics applicable to the base body 13 and the lid 14 comprises a glass component and a filler component. Examples of the glass component include $SiO_2$—$B_2O_3$ glass, $SiO_2$—$B_2O_3$—$Al_2O_3$ glass, $SiO_2$—$B_2O_3$—$Al_2O_3$-MO glass (incidentally, M designates Ca, Sr, Mg, Ba or Zn), $SiO_2$—$Al_2O_3$-$M^1O$-$M^2O$ glass (incidentally, $M^1$ and $M^2$ indicates the same or different Ca, Sr, Mg, Ba or Zn), $SiO_2$—$B_2O_3$—$Al_2O_3$-$M^3{}_2O$-$M^2O$ glass (incidentally, $M^1$ and $M^2$ are the same as the above-described), $SiO_2$—$B_2O_3$-$M^3{}_2O$ glass (incidentally, $M^3$ indicates Li, Na or K), $SiO_2$—$B_2O_3$—$Al_2O_3$-$M^3{}_2O$ glass (incidentally $M^3$ is the same as the above described), Pb glass, and Bi glass.

Further, Examples of the filler component include compound oxides of $Al_2O_3$, $SiO_2$, or $ZrO_2$ and an alkali earth metal oxide, compound oxides of $TiO_2$ and an alkali earth metal oxide, and compound oxides containing at least one selected from $Al_2O_3$ and $SiO_2$ (for example, spinel, mullite, or cordierite).

Further, when the base body 13 and the lid 14 are made of a metal material, these are formed into predetermined shapes by machining method, pressing method, MIM (Metal Injection Mold) method or the like.

Further, when the base body 13 and the lid 14 are made of a metal material, in order to prevent corrosion, it is preferable to subject a surface thereof to, for example, Au or Ni plating treatment, or cover coating treatment of resin coating of polyimide or the like. For example, in a case of Au plating treatment, it is preferable that a thickness thereof is about 0.1 to 5 µm.

The reactor 2 is contained in the package 7 by attaching the lid 14 to the base body 13 so as to cover the cavity by bonding by a metal brazing material such as Au alloy, Ag alloy, or Al alloy or glass material or by a seam weld method or the like.

For example, when bonded by Au—Sn brazing material, after previously welding Au—Sn brazing material to the lid 14, or placing between the base body 13 and the lid 14 Au—Sn brazing material formed into a frame-like shape by punching or the like by using a die or the like, the reactor 2 can be sealed inside the package 7 by bonding the lid 14 to the base body 13 by a sealing furnace or a seam welder.

Further, by covering at least an inner surface of the package 7 constituted by the base body 13 and the lid 14 with an Au or Al plating treatment film, radiation heat generated by the contained reactor 2 can efficiently be prevented and a temperature of the reacting apparatus 1 can be restrained from being elevated.

According to the above-described base body 13 and the lid 14, although a thickness is to be thinned to enable small-sized formation and low height formation of the reacting apparatus 1, a bending strength which is a mechanical strength is preferably equal to or larger than 200 MPa.

Further, the package 7 may be able to contain the reactor 2 at a vacant portion thereof, in addition to a case of constituting the package 7 by the base body 13 in the frame-like shape having the cavity and the lid 14 in the plate-like shape as shown in, for example, FIG. 1, the package 7 may be constituted by a base body in a plate-like shape and a lid obtained by rotating a U-like shape to the left by 90 degrees.

Further, the lead terminal 9 may preferably use a metal having a thermal expansion coefficient the same as or proximate to those of the base body 13 and the lid 14, for example, the lead terminal 9 made of Fe—Ni alloy, or Fe—Ni—Co alloy or the like can restrain a thermal strain from being generated against a temperature change in being practically used. Furthermore, the constitution can achieve an excellent performance of sealing the lead terminal 9 and the base body 13, and is excellent in bonding property and can ensure a strength, an excellent solderability and weldability necessary for mounting.

The lead terminal 9 is insulated from an insertion hole 10 of the base body 13 and is sealed and fixed thereto by the insulating sealing material 12 having an insulating property. The insulating sealing material 12 is made of a glass material such as borosilicate glass, alkali glass, an insulating glass containing lead as a major component, or a ceramic material such as aluminum oxide, and inside the insertion hole 10 formed at the base body 13, the base body 13 and the lead terminal 9 are electrically insulated from each other by the insulating sealing material 12 and the lead terminal 9 is sealed to be fixed. The insertion hole 10 inserted to the lead terminal 9 formed at the base body 13 needs a size by which the base body 13 and the lead terminal 9 are not brought into contact with each other to be conducted electrically, specifically, needs an inner diameter capable of ensuring an interval from the lead terminal 9 to the base body 13 by 0.1 mm or more.

Further, when the insulating sealing material 12 is made of a ceramic material such as aluminum oxide, the lead terminal 9 can be inserted to the insertion hole 10 of the base body 13 by way of the insulating sealing material 12 made of a ceramic material in, for example, cylindrical shape, and connection of the insulating sealing material 12 and the base body 13 and the connection of the insulating sealing material 12 and the lead terminal 9 can be carried out by a brazing material such as Au—Ge or Ag—Cu.

Further, the electrode 8 disposed on the reactor 2 is electrically connected to the lead terminal 9 by way of a bonding wire 11. Thereby, the surface of the reactor 2 or a heater formed at the inside thereof can be heated by way of the electrode 8. As a result, a reaction temperature can be maintained and a reaction of a substance can be stabilized in the reactor 2.

Further, in order to achieve an insulating property at the inside of the reacting apparatus, it is necessary to vacuum the inside of the reacting apparatus and when the reactor 2 is sealed, the sealing may be carried out by sealing a vacuum furnace by a brazing material or by a seam weld method within a vacuum chamber.

Further, at least one of the supply pipe 5 and the discharge pipe 6 may be formed with a plurality of grooves at an outer surface thereof at the inside of the package 7. Thereby, heat conduction from the reactor 2 to the base body 13 and the lid 14 can effectively be restrained by reducing heat conduction of the supply pipe 5 and the discharge pipe 6, and the supply pipe 5 or the discharge pipe 6 can pertinently be deformed. Further, a stress can be relaxed by pertinently deforming the supply pipe 5 or the discharge pipe 6 and connection of the supply pipe 5 and the discharge pipe 6 and the reactor 2, and connection of the supply pipe 5 and the discharge pipe 6 and the package 7 can excellently be maintained.

Further, although according to the example shown in FIG. 1, the supply pipe 5 and the discharge pipe 6 are connected to the lower surface of the ceramic reactor 2, these may be connected to an upper surface thereof in accordance with the specification of the ceramic reactor 2. Further, the plates 3 and 4 may be formed of a ceramic material, or a highly heat-resistant resin material such as polyimide.

Second Embodiment

Figure 10:
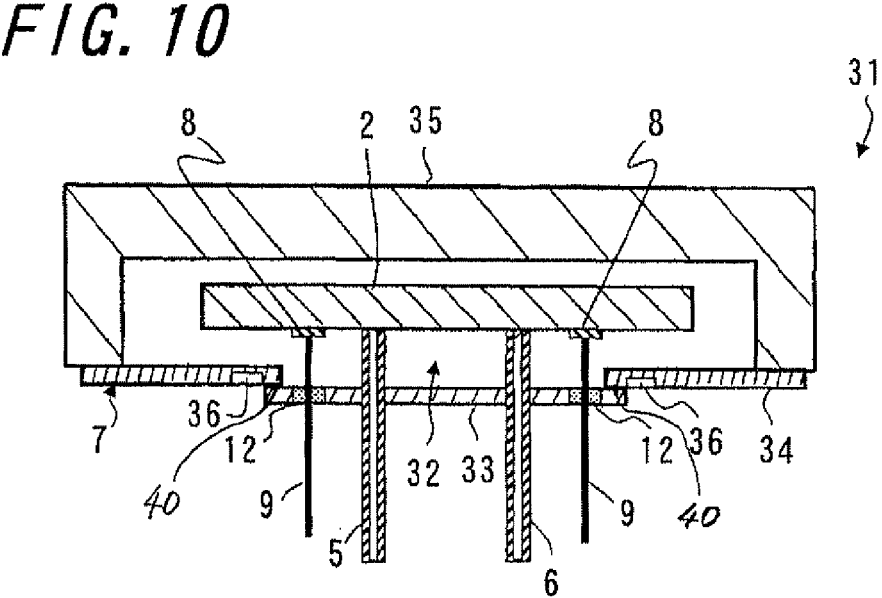
FIG. 10 is a sectional view showing a constitution example of a reacting apparatus according to a second embodiment of the invention.
Figure 11:
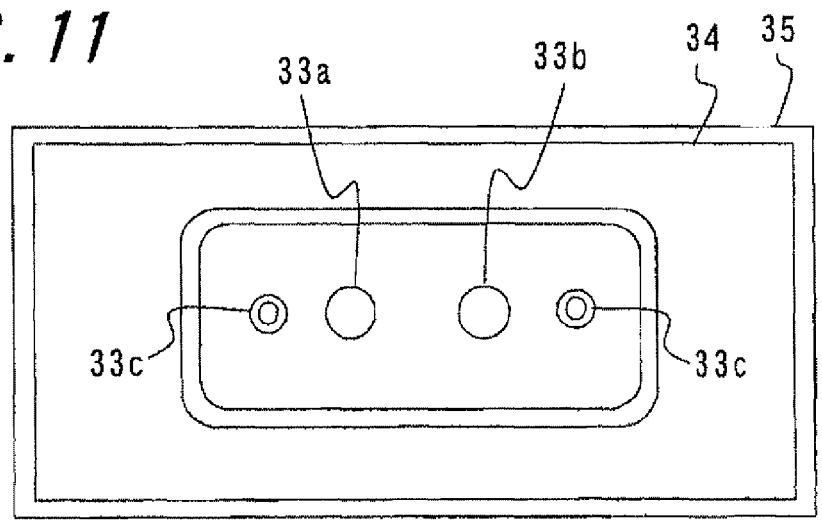
FIG. 11 is a bottom view of the reacting apparatus shown in FIG. 10.

Next, a reacting apparatus according to a second embodiment of the invention will be explained. FIG. 10 is a sectional view showing a constitution example of a reacting apparatus according to the second embodiment of the invention, and FIG. 11 is a bottom view of the reacting apparatus. As shown in FIG. 10, a reacting apparatus 31 according to the embodiment includes the reactor 2 having the supply port 2a and the discharge port 2b, and the package 7 to contain the reactor 2. Further, the package 7 includes an opening 32 and a plate-like member 33 to cover the opening 32. As shown in FIG. 11, the plate-like member 33 includes through holes 33a, 33b and 33c to which the supply pipe 5, the discharge pipe 6 and the lead terminal 9 are inserted, respectively. A surface of the reactor 2 is provided with the electrode 8, and the lead terminal 9 passing the through hole 33c of the plate-like member 33 is electrically connected to the electrode 8. Further, the through hole 33c may be arranged with the sealing material 12 to seal and fix the lead terminal 9 while insulating the lead terminal 9. Further, in FIG. 10, the package 7 is constituted by a plate-like base body 34 and a lid 35 having a cavity. The base body 34 and the lid 35 constitute a housing having a hollow portion containing the reactor 2. Further, in FIG. 10, components similar to those of the reacting apparatus 1 shown in FIG. 1 will be denoted by the same reference numerals. These components are the same as the components of the reacting apparatus according to the first embodiment in constitution and operation thereof so far as not particularly specified otherwise. Further, the base body 34 and the lid 35 may contain the reactor 2 at a vacant portion formed by the base body 34 and the lid 35, and may be the base body 34 in the plate-like shape and the lid 35 obtained by rotating the U-like shape to the left by 90 degrees as shown in, for example, FIG. 10 and may be constituted by the base body 34 having the cavity and the plate-like lid 35 as in the reacting apparatus 1 according to the first embodiment. That is, only shapes thereof differ from those of the base body 13 and the lid 14 of the reacting apparatus 1 according to the first embodiment and materials and bonding means thereof are similar.

Figure 12:
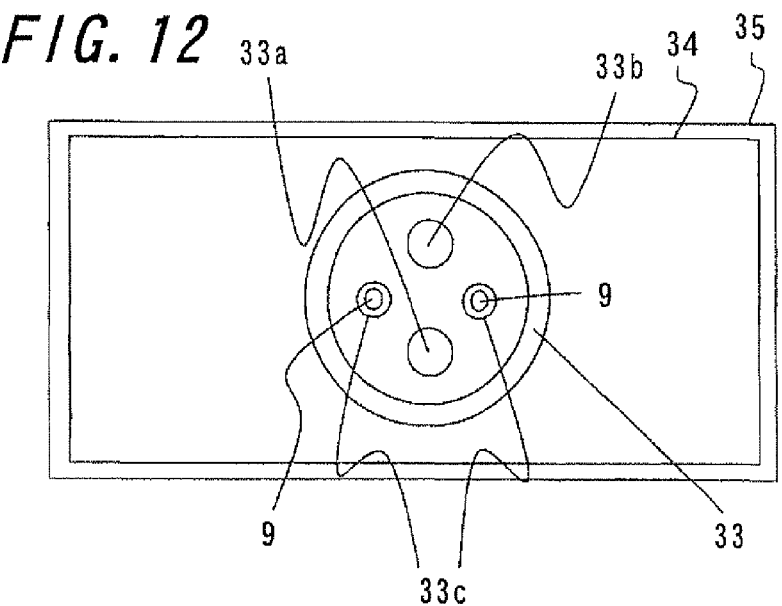
FIG. 12 is a bottom view of a reacting apparatus in the case where a plate-like member different from that of the reacting apparatus in FIG. 11 is used.

It is preferable that the plate-like member 33 is circular or polygonal in a bottom view thereof, and in the case of the polygonal shape, it is preferable to constitute respective corner portions by R shape. By adopting the structure, a stress in bonding the plate-like member 33 to a surrounding of the opening 32 of the base body 34 is relaxed, and bonding of the plate-like member 33 can be maintained excellently over a long period of time. Further, it is preferable that the plate-like member 33 is constituted by the circular shape, from the point of view of relaxing a thermal stress further in the bonding. FIG. 12 is a bottom view of a reacting apparatus in a case where the plate-like member 33 is constituted by the circular shape. Although according to the plate-like member 33 shown in FIG. 11, the through holes 33a, 33b and 33c are linearly aligned, the invention is not limited thereto but the through holes 33a, 33b, 33c may be arranged at arbitrary positions.

The plate-like member 33 includes the through hole 33a to which the supply pipe 5 is inserted, the through hole 33b to which the discharge pipe 6 is inserted, and the through hole 33c to which the lead terminal 9 is inserted. Further specifically, for example, it is preferable that through holes 33a and 33b to which the supply pipe 5 and the discharge pipe 6 are inserted are similar to shapes of cross sections of the supply pipe 5 and the discharge pipe 6, and it is preferable to design such that distances from outer edge portions of the supply pipe 5 and the discharge pipe 6 in the shapes of the cross sections to inner edge portions of the corresponding through holes 33a and 33b become 0.01 mm through 0.3 mm. Further, it is not necessarily needed that the shapes of the through holes 33a and 33b are similar shapes and the shapes are not particularly restricted so far as the supply pipe 5 and the discharge pipe 6 can be passed vertically and bonded.

For example, when the distances from the outer edge portions of the supply pipe 5 and the discharge pipe 6 to the inner edge portions of the through holes 33a and 33b are equal to or larger than 0.01 mm, it is facilitated to vertically pass the supply pipe 5 and the discharge pipe 6 to the plate-like member 33. Particularly, when the supply pipe 5, the discharge pipe 6, and the plate-like member 33 are subjected to Ni plating or Au plating treatment, respectively, it is convenient that the distances are equal to larger than 0.01 mm. On the other hand, when less than 0.3 mm, in a case in which the supply pipe 5 and the discharge pipe 6 are inserted to the corresponding through holes 33*a* and 33*b*, respectively, thereafter, bonded to the plate-like member 33 by using various brazing materials such as Au—Sn alloy, Au—Si alloy, Au—Ge alloy, or Ag—Cu alloy, the brazing member can sufficiently fill the gaps between the through holes 33*a* and 33*b* and the supply pipe 5 and the discharge pipe 6 and a failure in airtightness can be prevented.

Therefore, by designing the distances from the outer edge portions of the supply pipe 5 and the discharge pipe 6 in the shapes of the cross sections to the inner edge portions of the through holes 33*a* and 33*b* to be 0.01 mm through 0.3 mm, insertion of the supply pipe 5 and the discharge pipe 6 through the through holes 33*a* and 33*b* can smoothly be carried out and further, the gaps between the through holes 33*a* and 33*b* and the supply pipe 5 and the discharge pipe 6 can sufficiently be filled, the brazing member can form excellent meniscuses for the supply pipe 5, the discharge pipe 6 and the plate-like member 33, and the bonding strength can be increased.

According to the reacting apparatus 31 according to the embodiment, the supply pipe 5 and the discharge pipe 6 can be connected to the reactor 2 in the state of being bonded to the plate-like member 33, and therefore, the supply pipe 5 and the discharge pipe 6 can be connected to the reactor 2 in a lump, and a number of times of connecting to the reactor 2 can be reduced. Further, also the lead terminal 6 can be connected to the reactor 2 in a state of being bonded to the plate-like member 33, and therefore, a number of times of connecting to the reactor 2 can further be reduced. Thereby, a stress in connecting in the reactor 2 can be reduced, and therefore, connection of the supply pipe 5 and the discharge pipe 6 and the reactor 2, and furthermore, connection of the plate-like member 33 and the reactor 2 can excellently be maintained over a long period of time.

Further, by using the plate-like member 33, the supply pipe 5 and the discharge pipe 6 can be connected to the package 7 in a lump, and a number of times of connecting to the package 7 can be reduced. Further, also the lead terminal 6 can be connected to the package 7 simultaneously with the supply pipe 5 and the discharge pipe 6, and therefore, the number of times of connecting to the package 7 can further be reduced, and a stress in connecting in the package 7 is reduced. From the above, in comparison with a case of successively connecting a plurality of parts of the supply pipe 5 and the like individually, a stress in connecting to the reactor 2 and the package 7 is reduced, and warp of the reactor 2 and the package 7 is restrained. Further, airtight seal can be carried out by particularly restraining warp of the package 7, and therefore, a heat amount conducted to an outside of the package 7 can efficiently be reduced and a power generation loss can be reduced.

Further, by mounting the plate-like member 33 contiguously arranged with the supply pipe 5 and the discharge pipe 6, heat generated inside the reactor 2 can effectively restrained from being conducted to the outside of the package 7.

That is, the heat generated at the reactor 2 is conducted to the outside of the package 7 by way of the discharge pipe 6. Therefore, by efficiently moving the heat from the discharge pipe 6 to the supply pipe 5 by way of the plate-like member 33, the heat amount conducted to the outside of the package 7 can efficiently be reduced. Further, since the base body 34 includes the opening 32 and the plate-like member 33 is bonded to cover the opening 32, a distance of the discharge pipe 6 connected to the reactor 2 from the reactor 2 to be brought into contact with the plate-like member 33 can be prolonged, and therefore, a heat amount conducted to the outside of the package 7 from the discharge pipe 6 can be restrained.

Further, since the heat from the discharge pipe 6 can efficiently be moved to the supply pipe 5, a raw material supplied by way of the supply pipe 5 can be elevated to high temperatures. Therefore, there can be provided the package for containing the reactor capable of maintaining temperature inside the reactor 2 at high temperatures, preventing the power generation loss of a total of the reactor system from being increased, and therefore, considerably increasing the power generation efficiency.

Further, the base body 34 includes the opening 32, and therefore, warp produced at the base body 34 can be restrained when the base body 34 is sintered.

Further, the base body 34 includes the opening 32 and the plate-like member 33 is bonded to cover the opening 32 from an outside of the base body, and therefore, when the base body 34 is fabricated by a welding method or the like, the warp generated at the base body 34 can further effectively be restrained.

Further, the thickness of the plate-like member 33 is pertinently determined by the thicknesses and structure of the base body 1 and the lid 2 used, and it is preferable to constitute the thickness to be equal or larger than 0.10 mm. When equal to or larger than 0.10 mm, the plate-like member 5 is difficult to be deformed, and positioning of the supply pipe 5 and the discharge pipe 6 connected to the through holes 33*a* and 33*b* is facilitated. Further, although it is necessary to determine the upper limit of the thickness of the plate-like member 33 in consideration of stress in bonding to the base body 34 or the lid 35, for example, it is preferable to provide the thickness of about 0.20 mm in order to provide the sufficient positioning function by inserting the supply pipe 5 and the discharge pipe 6 to the through holes 33*a* and 33*b*.

Further, the plate-like member 33 is preferably formed of a member having a high heat conductivity in order to efficiently move the heat conducted through the discharge pipe 6 to the supply pipe 5. Examples of such a material include a metal material such as Fe-based alloy such as SUS, Fe—Ni—Co alloy, or Fe—Ni alloy, or oxygen free copper, such a material is formed in a predetermined shape by machining method, pressing method, MIM method, etching method or the like.

According to the reacting apparatus 31 shown in FIG. 10, a heat conducted to the discharge pipe 6 by way of the plate-like member 33 can be moved to the supply pipe 5, and therefore, a temperature of a raw material supplied by way of the supply pipe 5 can be elevated. Therefore, there can be provided the package for containing the reactor capable of maintaining the temperatures inside the reactor 2 at high temperatures, preventing the power generation loss of the total of the reactor 2 system from being increased, and furthermore, capable of significantly increasing the power generation efficiency.

Further, the heat can be moved efficiently from the discharge pipe 6 to the supply pipe 5, and therefore, a reaction substance generated at the reactor 2 can efficiently be cooled, a large-sized cooling system is dispensed with and a total of the reactor system can be downsized. As a result, the package for containing the reactor very suitable for being used for a portable apparatus can be provided.

It is preferable to bond the plate-like member 33 formed in this way from the outside of the base body 34. By bonding the plate-like member 33 from the outside of the base body 34, a distance between the plate-like member 33 and the reactor 2 can be prolonged. In addition thereto, also the distance of the discharge pipe 6 from the reactor 2 to the plate-like member 33 is prolonged, and therefore, the heat amount conducted to the discharge pipe 6 can be reduced, and therefore, a heat amount conducted to the outside of the package 7 from the discharge pipe 6 can be restrained.

Further, when the plate-like member 33 is bonded to the base body 34, brazing, projection method, electron beam method, laser beam method or the like may be used.

Further, in a case of bonding the plate-like member 33 from the outside of the base body 34, it is preferable to provide a recess portion 36 to a portion of the base body 34 proximate to the portion 40 bonding with the plate-like member 33.

Here, the portion of the plate-like member 33 of the base body 34 proximate to the bonding portion 40 is a portion of the base body 34 proximate to an outer peripheral edge of the plate-like member 33, and it is preferable to arrange the recess portion 36 at a position the same as that of the outer peripheral edge of the plate-like member 33 or an outer side of the outer peripheral edge, that is, in a direction of being apart from the opening 32 in a sectional view thereof. Here, a case in which the recess portion 36 is disposed at a position the same as that of the outer peripheral edge of the plate-like member 33 refers to a case in which the position of the opening end of the recess portion 36 on the side of the plate-like member coincides with the position of the outer peripheral edge of the plate-like member 33.

Further, although in the reacting apparatus shown in FIG. 10, an opening of the recess portion 36 is provided at the outer surface of the base body 34, that is, the surface on the side of the plate-like member 33, the opening may be provided at an inner side surface of the base body 34, that is, a surface on the side of the reactor 2. Also in that case, it is preferable to arrange the recess portion 36 at a position the same as that of the outer peripheral edge of the plate-like member 33, or the outer side of the outer peripheral edge, that is, in a direction of being apart from the opening 32 in the sectional view. In this case, a case in which the recess portion 36 is disposed at the position the same as that of the outer peripheral edge of the plate-like member 33 refers to the case in which the position of the opening end on the side of the plate-like member of the recess portion 36 coincides with that of the outer peripheral edge of the plate-like member 33 with the base body 34 interposed there between. That is, in this case, in a plane view, the position of the opening end on the side of the plate-like member of the recess portion 36 and that of the outer peripheral edge of the plate-like member 33 coincides with each other.

Further, although a shape, a depth of the recess portion 36 can pertinently be formed by the stress in bonding the base body 34 and the plate-like member 33, it is preferable to form the recess portion 36 over an entire surrounding of the plate-like member 33, and it is preferable to constitute the depth which does not penetrate the base body 34.

By providing the recess portion 36 at the portion proximate to the bonding portion 40 of the plate-like member 33 and the base body 34, the stress produced at the base body 34 in bonding the base body 34 and the plate-like member 33 can be relaxed. Thereby, bonding of the base body 34 and the plate-like member 33 can excellently be maintained over a long period of time. Therefore, preferably, it is further preferable to form the recess portion 36 over the entire surrounding of the plate-like member 33.

From the above, according to the reacting apparatus 31 of the embodiment, the heat amount conducted to the outside of the package can efficiently be reduced, and therefore, power generation loss can be reduced.

Figure 13:
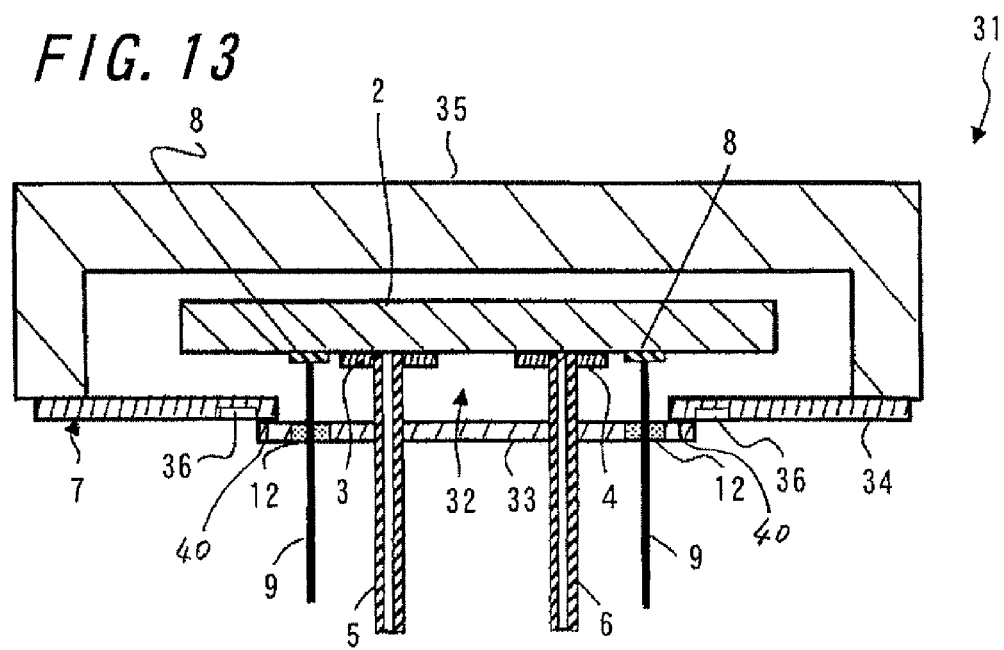
FIG. 13 is a sectional view showing another constitution example of another reacting apparatus according to the first embodiment of the invention.

Further, according to the reacting apparatus 31 of the embodiment, similar to the reacting apparatus 1 according the first embodiment, the plates 3 and 4 or the plate 22 may be bonded to the surface of the reactor 2. FIG. 13 is a sectional view showing a constitution example of the reacting apparatus in a case where the embodiment 1 and the embodiment 2 are combined. In FIG. 13, components the same as those of FIG. 1 and FIG. 10 will be denoted by the same reference numerals. Further, as shown in FIGS. 8 and 9, a constitution of respectively integrating the plates 3 and 4 corresponding to the supply pipe 5 and the discharge pipe 6 may be provided. In such a case, the supply pipe 5 and the discharge pipe 6 can be bonded to the plate-like member 33 by arranging the supply pipe 5 and the discharge pipe 6 apart from each other by a predetermined distance, and therefore, the supply pipe 5 and the discharge pipe 6 can easily be connected to the reactor 2 in one motion in the state of being apart from each other by the predetermined distance.

The invention claimed is:

1. A reacting apparatus comprising:
a reactor comprising a first port and a second port on a surface thereof;
a first member connected to the surface of the reactor, the first member comprising a first through hole, a part of a first opening of the first through hole being covered by the surface of the reactor and an other part of the first opening communicating with the first port;
a second member connected to the surface of the reactor, the second member comprising a second through hole, a part of a second opening of the second through hole being covered by the surface of the reactor and an other part of the second opening communicating with the second port;
a supply pipe connected to the first member, the supply pipe communicating with the first port by way of the first through hole,
a discharge pipe connected to the second member, the discharge pipe communicating with the second port by way of the second through hole;
a housing comprising a cavity containing the reactor and the first and second members, and a third opening communicated with the cavity; and
a connecting member connecting the supply pipe and the discharge pipe apart from each other by a distance, the connecting member covering the third opening and having through holes through which the supply pipe and the discharge pipe penetrate,
the housing having a recess portion on a surface thereof adjacent to a bonding portion of the connecting member and the surface of the housing.

2. The reacting apparatus of claim 1, wherein the first and second members are a flat plate shape or a cylindrical shape.

3. The reacting apparatus of claim 1, wherein the first and second members are integrated with each other.

4. The reacting apparatus of claim 1, wherein $O \leqq L1 < d1$ and $O \leqq L < S1$, where L1 is a longest distance along a first direction in a region of the first member covering the first port, d1 is an opening diameter of the first port, and S1 is a distance along the first direction from an edge of the first opening to an outer peripheral edge of the first member, and $O \leqq L2 < D1$, where L2 is a longest distance along the first direction in a region of the first opening covered by the surface of the reactor, and D1 is an opening diameter of the first opening, and wherein $O \leqq L3 < d2$ and $O \leqq L3 < S2$, where L3 is a longest distance along a second direction in a region of the second member covering the second port, d2 is an opening diameter of the second port, and S2 is a distance along the second direction from an edge of the second opening and to an outer peripheral edge of the second member, and $O \leq L4 < D2$, where L4 is a distance along the second direction between the edge of the second opening and an edge of the second port in a region of the second opening covered by the surface of the reactor, and D2 is an opening diameter of the second opening.

5. The reacting apparatus of claim 1, further comprising a connecting member connecting the supply pipe and the discharge pipe apart from each other by a distance.

6. The reacting apparatus of claim 1, wherein the connecting member is a plate shaped member bonded to an outer surface of the housing.

7. The reacting apparatus of claim 1, wherein the connecting member has a circular shape or a polygonal shape in plan view.

8. A reacting apparatus comprising:
a reactor comprising a first port and a second port on a surface thereof;
a supply pipe comprising a first end portion having a first opening, the first end portion being connected to the surface of the reactor, a part of the first opening being covered by the surface of the reactor and an other part of the first opening communicating with the first port; and
a discharge pipe comprising a second end portion having a second opening, the second end portion being connected to the surface of the reactor, a part of the second opening being covered by the surface of the reactor and an other part of the second opening communicating with the second port;
a housing comprising a cavity containing the reactor and the first and second members, and a third opening communicated with the cavity; and
a connecting member connecting the supply pipe and the discharge pipe apart from each other by a distance, the connecting member covering the third opening and having through holes through which the supply pipe and the discharge pipe penetrate,
the housing having a recess portion on a surface thereof adjacent to a bonding portion of the connecting member and the surface of the housing.

9. A package for containing a reactor comprising:
a housing having a cavity adapted for containing a reactor and having an opening communicated with the cavity; and
a covering member covering the opening, the covering member having through holes through which a supply pipe and a discharge pipe are adapted to penetrate, the supply pipe and the discharge pipe being adapted to be connected to the reactor,
the housing having a recess portion on a surface thereof adjacent to a bonding portion of the covering member and the surface of the housing.

10. The package of claim 9, wherein the covering member is bonded to an outer surface of the housing.

11. The package of claim 9, wherein the covering member has a circular shape or a polygonal shape.

12. A reacting apparatus comprising:
a reactor;
a supply pipe for supplying fluid to the reactor, the supply pipe being connected to the reactor;
a discharge pipe for discharging fluid from the reactor, the discharge pipe being connected to the reactor;
a housing comprising a cavity to contain the reactor and an opening communicated with the cavity; and
a covering member to cover the opening, the covering member having through holes through which the supply pipe and the discharge pipe penetrate,
the housing having a recess portion on a surface thereof adjacent to a bonding portion of the covering member and the surface of the housing.

* * * * *